Aug. 5, 1969     A. E. BISHOP     3,458,998
DUAL-MODE POWER STEERING SYSTEM
Filed July 18, 1967     5 Sheets-Sheet 2
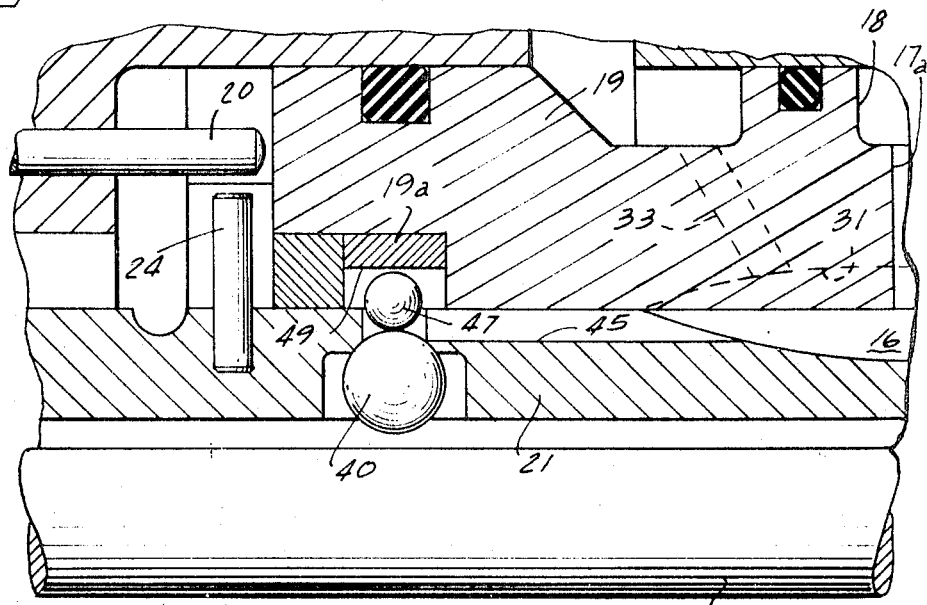
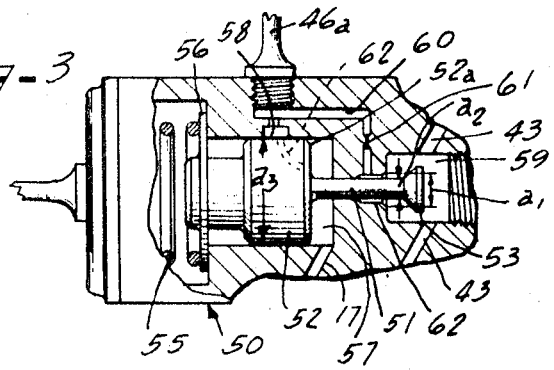
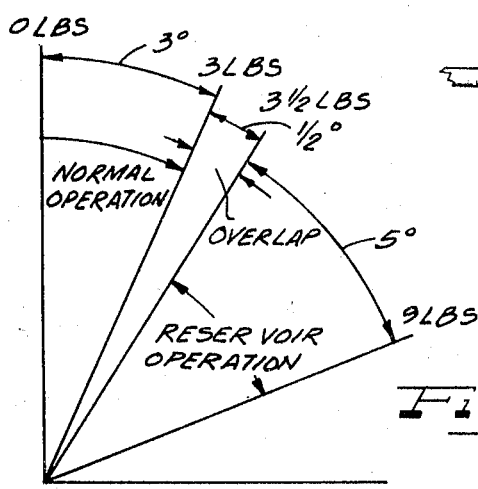
INVENTOR.
ARTHUR E. BISHOP
BY *Hill, Sherman, Meroni, Gross & Simpson*
                                    ATTORNEYS

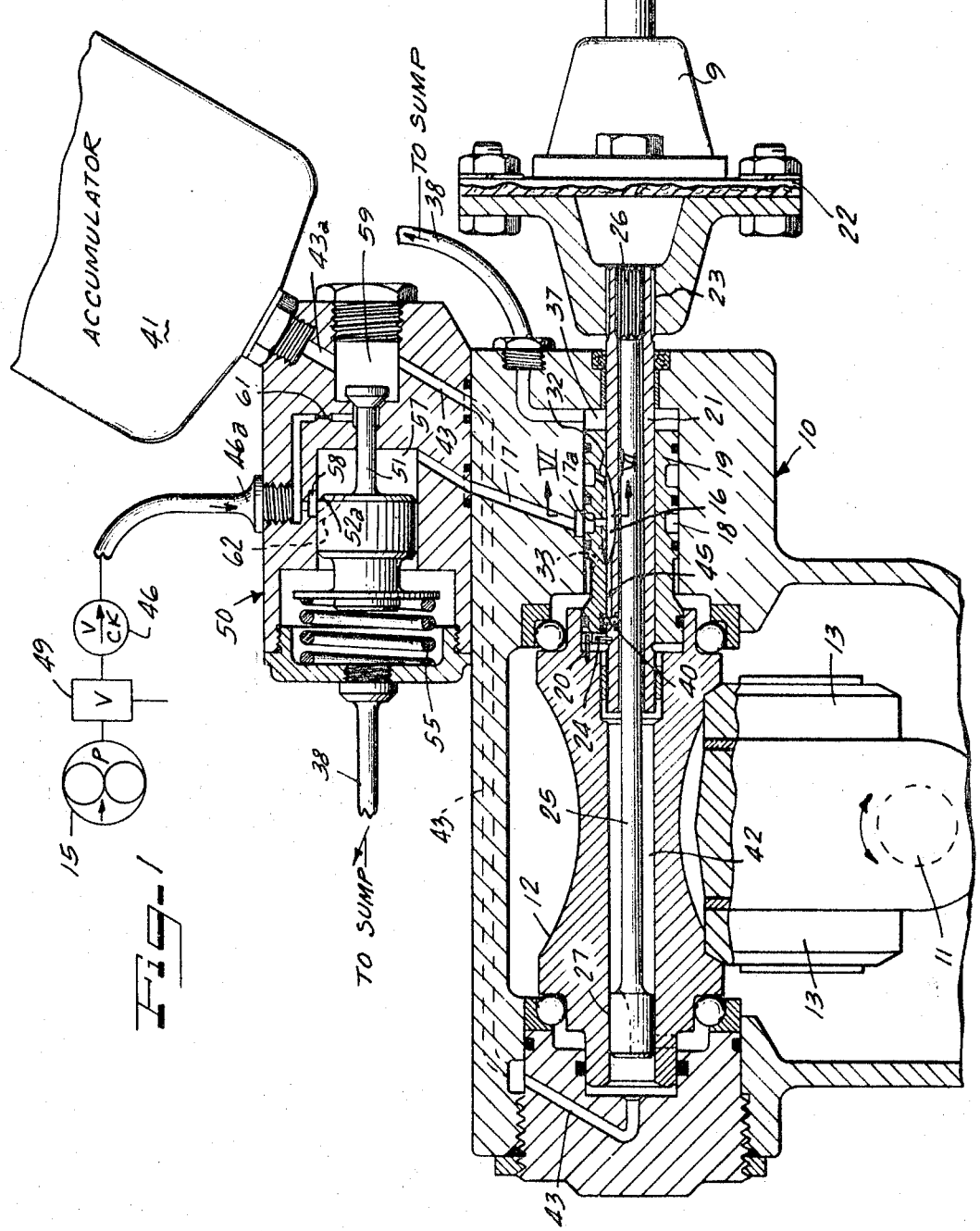

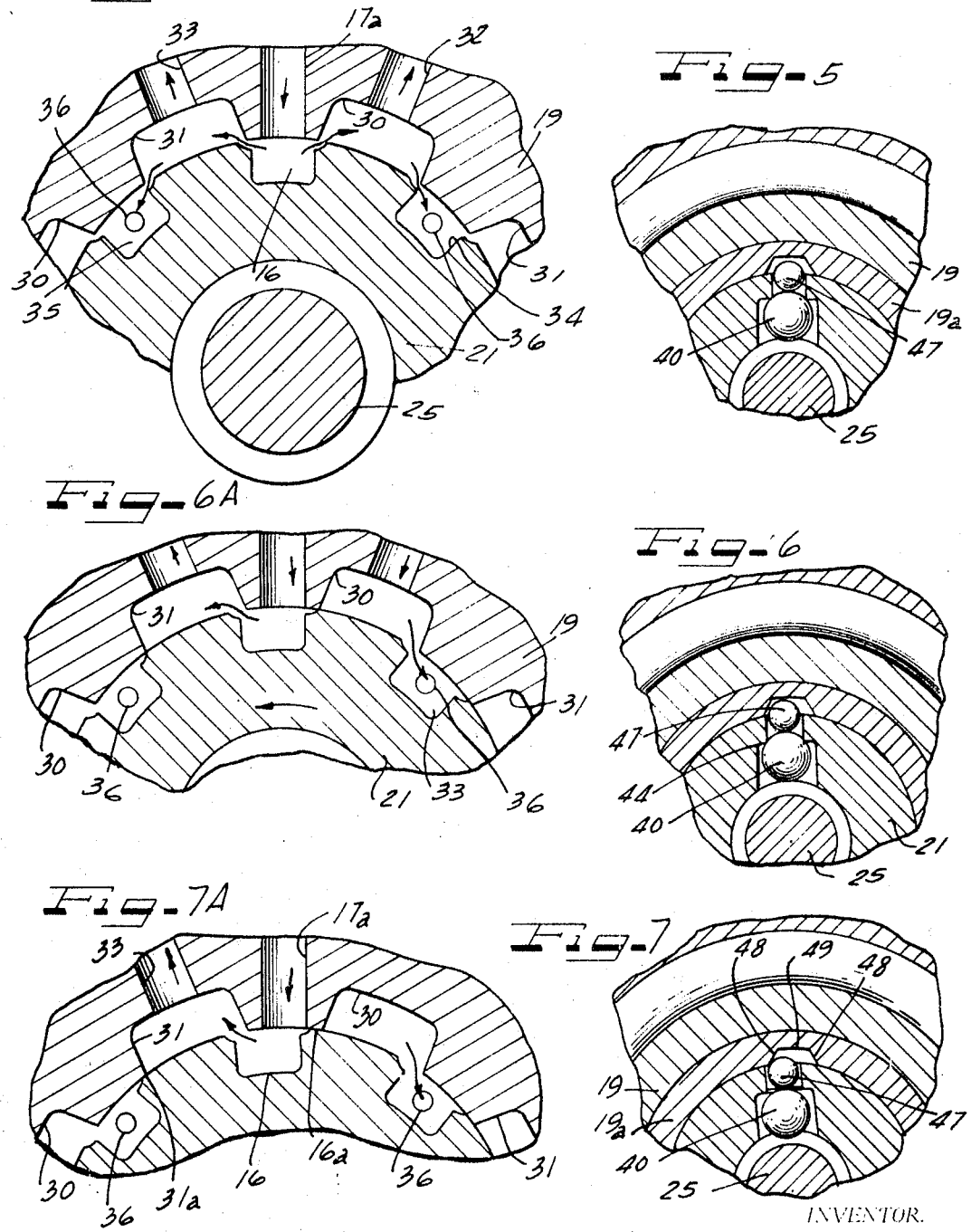

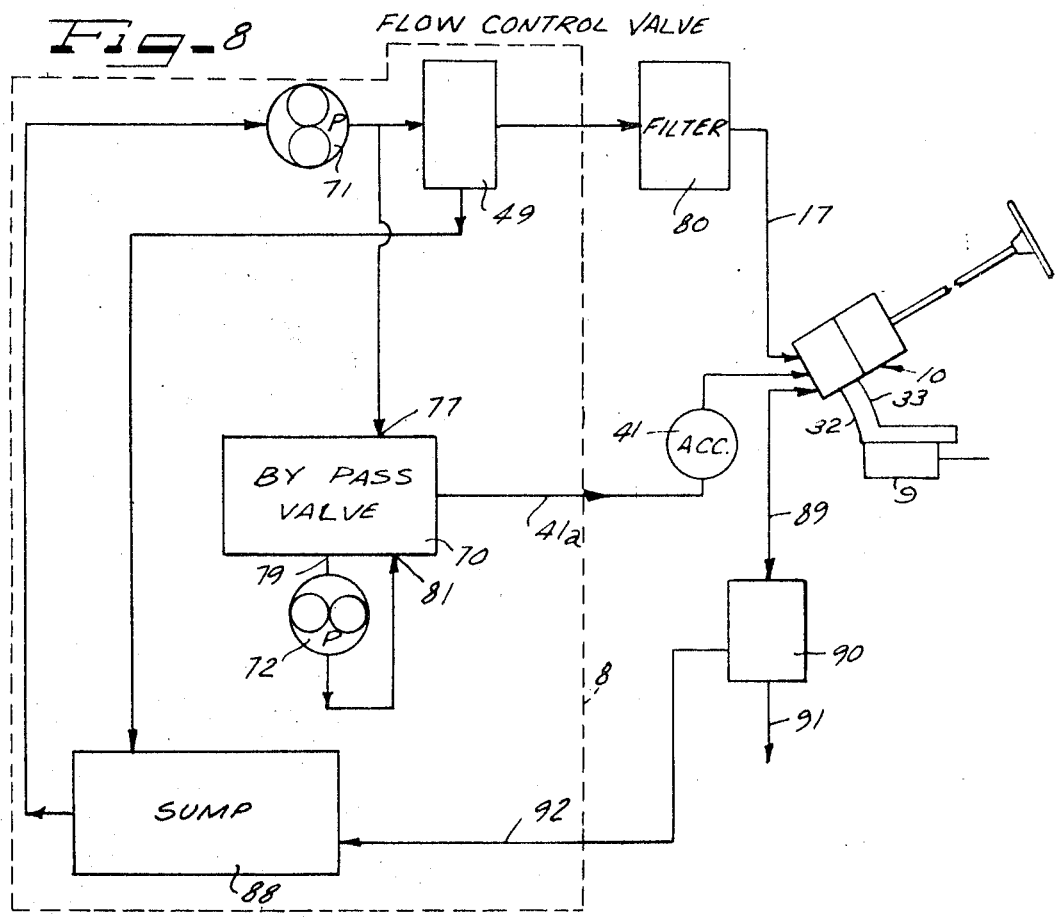

Aug. 5, 1969   A. E. BISHOP   3,458,998
DUAL-MODE POWER STEERING SYSTEM
Filed July 18, 1967   5 Sheets-Sheet 5
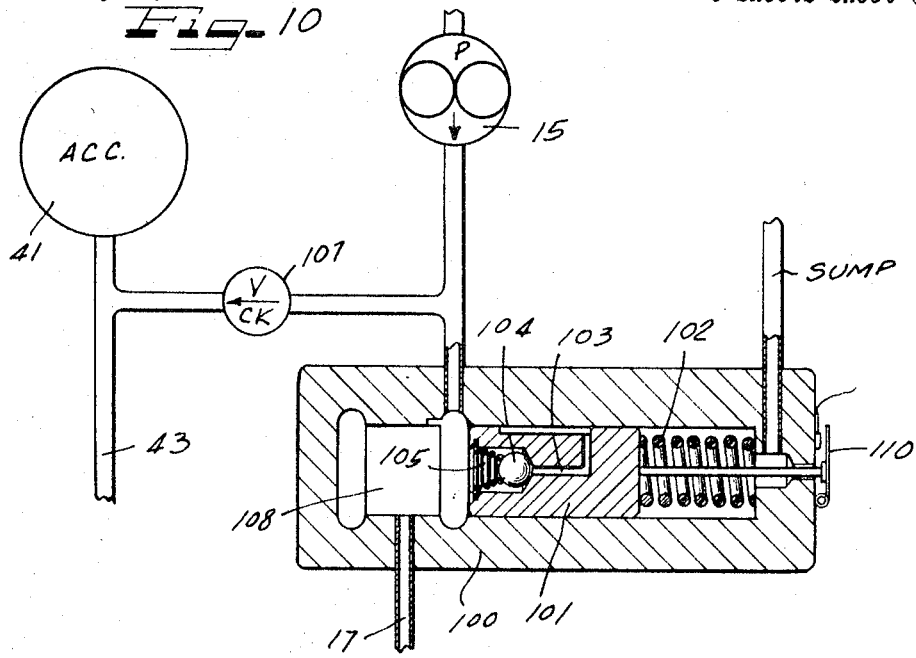
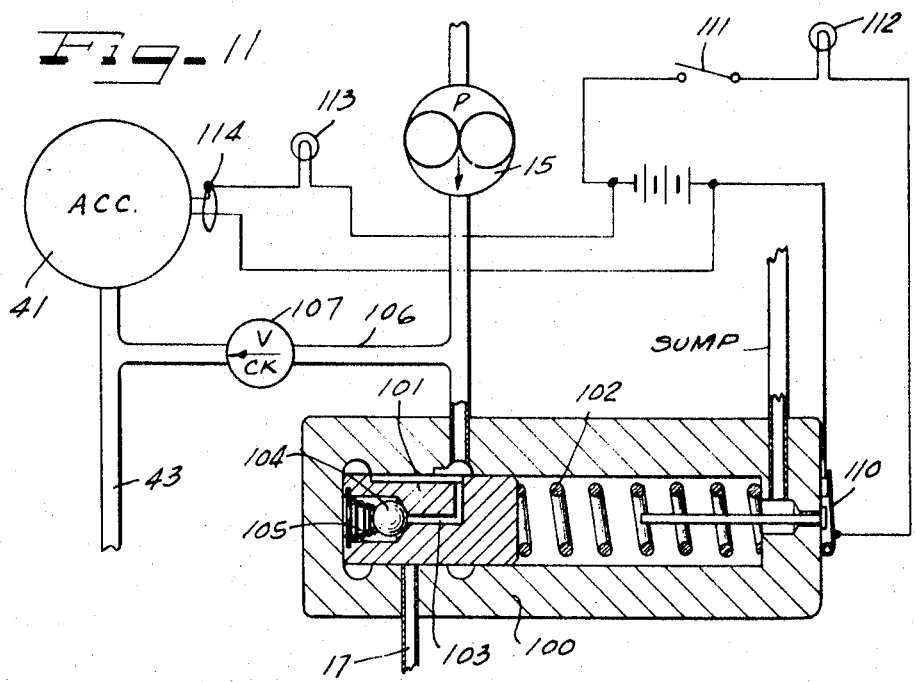
INVENTOR.
ARTHUR E. BISHOP
BY ATTORNEYS United States Patent Office 3,458,998
Patented Aug. 5, 1969

3,458,998
DUAL-MODE POWER STEERING SYSTEM
Arthur E. Bishop, 5516 Westwood Lane,
Birmingham, Mich. 48009
Filed July 18, 1967, Ser. No. 654,204
Int. Cl. F15b 1/02, 13/042
U.S. Cl. 60—51                            12 Claims

ABSTRACT OF THE DISCLOSURE

A system is provided in which an open-center, four-way valve is employed for the actuation of a power steering system for automotive vehicles. Over control of the open-center, four-way control valve occasioned by engine failure or a peak power steering demand condition causes the opening of an accumulator reservoir of oil under high pressure. This reserve supply of oil under high pressure serves to operate the steering gear for a period of time in an engine-fail situation and, similarly, operates to provide peak power in high steering load situations. The accumulator is isolated from the steering circuit except under the circumstances above described and is recharged in various ways, in accordance with the invention. By providing a separate high pressure reservoir system, ordinary power steering may be accomplished by means of a relatively low pressure and hence inexpensive, power steering pump which may, further, if desired, comprise the standard lubricating oil pump of the modern automotive engine. Alternatively, a conventional power steering pump may be employed with special controls to provide recharging the accumulator over a period of time between peak power uses.

Background of the invention

Power steering systems have become commonplace in the automotive industry. In more recent times, such a high percentage of total automotive output has incorporated a power steering system that such systems can no longer be considered merely a luxury item. The additional expense occasioned by the use of a power steering system as compared with a manual steering system has, accordingly, occasioned careful investigation of the items of increased cost found in power steering systems. Additionally, much thought has gone into efforts to provide a completely fail-safe power steering system in which engine failure and excess steering loads are eliminated as hazards to power steering operation.

An evaluation of the components of a power steering system, namely, a steering controlled valve, a hydraulic pump, and a fluid motor responsive to operation by the steering valve, has suggested to those working in the art that an increase in pump capacity is necessary to provide acceptable operation at high peak steering loads. The recent adoption by some companies in the automotive industry of variable ratio power steering in which the steering load increases substantially in the parking range of vehicle operation has also suggested the need for a power steering pump of increased capacity. Safe, low-effort operation of the vehicle when the enine, or source of power to the power steering pump is inactive or disconnected has, however, eluded those in the art. Heretofore, all proposed advances have very considerably increased the cost of the power steering package and to applicant's knowledge have not truly satisfied the clear requirements of decreased cost and increased steering safety.

Summary of the invention

In accordance with the present invention, a power steering system is provided for automotive vehicles in which emergency steering operation is provided during periods of engine inactivity. This is accomplished in accordance with the present invention by the addition of a high pressure accumulator containing a reservoir of power steering hydraulic fluid under high pressure. In normal operation, the accumulator is isolated from the steering motor by a normally closed valve so that normal steering operation does not cause depletion of the pressurized oil in the accumulator. During conventional steering operation, which is accomplished by way of an open-center, four-way power steering valve responsive to steering torque applied at the rim of the steering wheel, the normally closed accumulator valve remains closed. However, upon the application of a steering torque at the rim of the steering wheel, in excess of torque sufficient to fully open the four-way valve to its maximum design condition, means is provided for opening the closed accumulator valve thereby applying accumulator fluid at high pressure to the power steering motor. Since, as above noted, fluid under pressure is supplied by the accumulator to the steering motor only during such time as a normally closed valve is held open, loss of pressure from the accumulator is only occasioned during such time as the valve is thus held open. Since, further, the fluid under pressure from the accumulator operates to move the dirigible wheels, and since the closed center accumulator valve is similarly actuated by the steering wheel, and is responsive to the position of the dirigible wheels, application of fluid from the accumulator operates to reclose the normally closed valve. It has been found, accordingly, that in actual operation, only very small amounts of fluid under pressure from the accumulator are necessary to provide power at unusually high load conditions or, alternatively, to provide power during situations in which the conventional or standard power steering system is out of operation due to engine failure, pump belt failure, or other reasons.

The accumulator valve incorporated in the structure of the present invention is a relatively inexpensive valve since it is unnecessary to provide for feel-back in the accumulator valve. This is true since the accumulator is only open to the power steering motor during conditions of maximum torque application at the rim of the wheel, a condition in which finesse of feel is unimportant to successful valve operation.

As those skilled in the art of hydraulic pump construction are aware, a moderate pressure, large capacity, hydraulic pump may be manufactured in a relatively inexpensive manner. Such pumps do not provide objectionable noise and are capable of providing power steering fluid in sufficient quantity and pressure to meet almost all power steering requirements. They do not, however, meet all power steering requirements and, accordingly, it has become conventional practice to supply larger capacity and relatively higher pressure power steering pumps at substantial additional cost. Such large volume high pressure pumps have been considered necessary in order to provide adequate safety factor during vehicle operation and to prevent any possibility of the vehicle operator overtaking the pump. For example, if the output capacity and pressure of the power steering pump are insufficient to make a given turn of the steering wheel, the operator will turn the steering wheel to such point as the maximum pump output is being employed for steering purposes and, an attempt to continue beyond that point will react in effect as if the steering is 100% manual steering. In effect, the operator meets a point of steering resistance in which a continued steering effort becomes substantially instantly ineffective to provide continued or further steering motion. In effect, the operator has overtaken the pump. In test maneuvers recently conducted, it has been found that during obstacle avoidance maneuvers, a power steering pump incapable of providing all of the hydraulic liquid under pressure demanded of the steering valve, provides an unsafe vehicle and one in which the driver becomes incapable of providing valid steering signals. It has generally been considered essential that the vehicle operator not overtake the pump and, accordingly, in circumstances of high vehicle weight, etc., it has been conventional practice to provide expensive high output pumps.

As a matter of fact, however, the immediately obvious solution of providing a high pressure, high output pump is not a satisfactory one from the over-all point of view. The problems that arise from the attempt to manufacture a high volume pump operating at high pressures are extremely difficult. It has been found that the manufacture of high volume, high pressure pumps is attendant with very high noise levels in the pump and the provision of a truly efficient, quiet, high capacity, high pressure pump causes a very material additional expense. Further, the use of larger pumps introduces problems of pump overheating at high speeds and excessive torque demands on the engine. The present invention eliminates such high expense factors by providing a conventional moderate capacity steering pump in combination with an accumulator and means for recharging the accumulator as required. In accordance with the present invention, the accumulator recharging system operates against a pressure head, and accordingly absorbs torque from the engine only during periods of accumulator replenishment and periods of peak steering torque needs. The cost of a small hydraulic accumulator and appropirate recharge valving or a small capacity, high pressure, pump in combination with the usual medium capacity pump is smaller than that of the high pressure pump systems previously contemplated for imposing larger demands on the pump power steering applications. In fact, it is practical to employ the standard automotive engine lubricating oil pump for purposes of supplying the relatively low pressure steering requirements, thereby providing a substantially foolproof and extremely inexpensive source of steering fluid under useful steering pressures.

In conventional practice, it has been found that a standard, moderate capacity, moderate pressure pump providing one and one-half to two and one-half gallons per minute flow and using a steering ratio on the order of 20 to 1 will accommodate a turning rate of the steering wheel of approximately one revolution per second. This will suffice for normal contingencies but may not cover the occasional need for fast action, such as for example, in an avoidance maneuver, nor will it cover the situation in which heavy loads are required in parking. To provide a pump capable of providing in excess of two and one-half gallons per minute with sufficient pressure capabilities to provide a greater turning rate capability causes greater initial expense and, further, it has been found that such pumps take sufficient horsepower from the engine as to stall the engine during low-speed (for example, parking) conditions. In accordance with the present invention, a conventional pump providing a flow rate on the order of two and one-half gallons per minute may be provided to give a power assisted steering with a maximum manual effort at the rim of the wheel of about three pounds. If the manual effort overtakes the pump, substantially increased manual effort would be required to provide additional turning, but by means of the additional normally closed valve employed in accordance with the present invention, an attainment of a higher level of manual effort, for example, five pounds at the rim of the wheel, will cause the normally closed valve to open, giving an additional assist. Upon an engine failure or in other words, a power-off situation, movement of the steering wheel manually to a five-pound condition would cause opening of the normally closed valve to connect the accumulator to the power steering motor to thereby provide power assist turning until such time as the accumulator is reduced to a no-pressure condition. A built-in safety factor is provided in the present system due to the fact that increased manual effort is required to provide the boosted or augmented power supply and, accordingly, the presence of such an increased manual effort will signal an unusually high steering load or high turning rate, or, when neither of these is evident, a power failure so that the operator may move the vehicle off the highway for repairs.

The above system of augmented, high pressure oil supply has many advantages independently of the manner of recharging the accumulator. However, in accordance with the present invention, several means and devices are illustrated for accomplishing this recharge. They may include a part-time bypass of fluid under pressure from the conventional power steering pump capable of providing a relatively high pressure at a relatively moderate or low volume; a separate high pressure source connected on demand to the accumulator or, alternatively, connected under some predetermined non-command sequence, such as for example, immediately following engine starting.

It is, accordingly, an object of the present invention to provide a dual-mode power steering system incorporating both open center and closed center steering valving.

Another object of the present invention is to provide a simplified safety alert steering system providing indication of power failure and at the same time providing a reserve emergency power steering supply.

Another object of the present invention is to provide an inexpensive power steering system capable of providing down-the-road power steering and a reserve for heavy load steering conditions, such as parking or rapid avoidance maneuvers.

A feature of the invention resides in the utilization of a high pressure constantly charged accumulator for storing fluid under high pressure for emergency use.

Another feature of the invention is the utilization of a conventional relatively low volume, high pressure, power steering pump for recharging an accumulator during periods of low power need to thereby provide a high power output during short term, high load steering conditions.

Still other and further objects and features of the invention will become apparent to those skilled in the art from a consideration of the attached specification and drawings wherein several embodiments of the invention are shown by way of illustration only.

Description of the drawings

FIGURE 1 is a cross-sectional view of a power steering system constructed in accordance with the presence invention;

FIGURE 2 is an enlarged sectional view illustrating the normally closed value configuration;

FIGURE 3 is a cross-sectional view of the recharging valve illustrated in FIGURE 1, in an accumulator-charging condition;

FIGURE 4 is a graphic illustration of the relationship between open-center and normally closed steering gear operation;

FIGURE 5 is a cross-sectional view taken along the line V—V of FIGURE 2;

FIGURE 5a comprises a partial cross-sectional view taken along the line VI—VI of FIGURE 1;

FIGURE 6 comprises a cross-sectional view taken along the line V—V of FIGURE 2 with the parts turned slightly relative to the disclosure of FIGURE 5;

FIGURE 6a is a partial cross-sectional view taken along the line VI—VI of FIGURE 1 with the parts angularly displaced relative to the showing of FIGURE 5a;

FIGURE 7 comprises a cross-sectional view taken along the line V—V of FIGURE 2 with the component parts still further misaligned relative to FIGURES 5 and 6;

FIGURE 7a is a partial cross-scetional view taken along the line VI—VI of FIGURE 1 with the component parts still further misaligned relative to the positions thereof shown in FIGURES 5a and 6a;

FIGURE 8 is a diagrammatic illustration of a further embodiment of the power steering system shown in FIGURE 1 of the present invention and incorporating engine oil pump pressurization;

FIGURE 9 is an enlarged cross-sectional view of the bypass valve employed in the system shown in FIGURE 8;

FIGURE 10 is a diagrammatic illustration of a still further power steering embodiment constructed in accordance with the principles of the present invention and providing simplified accumulator recharging; and FIGURE 11 is a diagrammatic view of the system shown in FIGURE 10 with the parts in an accumulator-charging condition.

Detailed description

As above described, the present invention provides a basic construction in which hydraulic steering is accomplished in a dual mode. Power steering is accomplished throughout the ordinary range of power steering load and under normal circumstances in which the power steering pump is fully adequate, by way of a four-way open-center valve. This may readily be seen from a consideration of the figures where a steering gear generally indicated at 10 comprises a conventional pitman arm shaft 11 operatively connected to dirigible wheels (not shown) of a vehicle having a prime mover or engine schematically shown at 8 in FIGURE 8, and oscillated by way of an hourglass worm 12 and worm follower rollers 13. Power may be applied to the pitman shaft 11 by way of a double acting hydraulic motor schematically shown at 9 in FIGURE 8 but may take any conventional form which is preferably directly connected to the output pitman shaft 11. Such an arrangement is further illustrated, for example, in my earlier United States Letters Patent No. 2,865,218 dated Dec. 23, 1958. In such conventional operation, a four-way rotary type valve, for example, as described in United States Letters Patent No. 3,033,051, may satisfactorily be employed for directing fluid under pressure from a conventional moderate capacity steering pump digrammatically illustrated at 15 via an inlet conduit 17 and groove 18 in valve sleeve 19. The sleeve 19 is keyed by means of a pin 20 to hourglass worm 12 for slackless rotation therewith while valve core 21 is directly driven by the steering shaft 9 by way of a universal joint 22 and spline 23. Hourglass worm 12 is driven by way of a torsion bar 25 directly driven with core 21 by the spline connection 26 and a fixed connection 27. The torsion bar 25 provides a resilient relative rotation between the core 21 and valve sleeve 19 through a limited range provided by a lost motion pin connection 24 between the sleeve 19 and core 21.

As above described, the general operation of the system is well known in the art and its operational characteristics can be understood from a consideration of FIGURES 1, 5a and 6. As can be seen from FIGURE 5a, hydraulic pressure is introduced into the valve core by way of conduit 17a in the sleeve 19 and, when the steering shaft 9 is not transmitting torque via the torsion bar 25, the valve is in an open-center condition in which hydraulic liquid is passed to channel 16 in the core 21 and from thence flows equally into power cylinder grooves 30 and 31 leading, respectively, to conduits 32 and 33 leading to opposite sides of the steering motor 9. At the same time, the channels 30, 31 are ported respectively to sump grooves 34 and 35 ported to end space 37 via ports 36, 36 and thence via conduit 38 to the sump. Upon rotation of the core 21 in a counterclockwise direction relative to the sleeve 19 as shown in FIGURE 6a, fluid under pressure is ported to cylinder channel 31 while channel 30 is closed off from the hydraulic source and is ported to sump channel 34. Clockwise rotation of the core 21 relative to sleeve 19 would, of course, alternatively, pressurize channel 30 and power cylinder conduit 32. The degree of valve opening and, hence flow, is controlled by the relative movement between the core 21 and sleeve 19, which relative movement is preferably under the control of mechanical simulated feel, or resistive effort provided by the torsion bar 25. During the normal travel of the valve core 21 relative to the sleeve 19, approximately three degrees of angular rotation will carry the valve parts from their neutral to their full power condition. This is shown in the graph of FIGURE 4. Deflection of the torsion bar 25 to provide three degrees normal full-open operation will require a force approximately three pounds at the rim of the steering wheel. If at the time the torsion bar 25 has been deflected through the three degree range illustrated, and the full output of the power steering pump has failed to cause the power steering worm, and hence the sleeve 19, to move with the core within the three degree limit, overlap of the valve ports will occur. Such an overlap is just taking place at FIGURE 6a where the core 21 has moved to a full power condition. A slight overlap, of approximately one-half degree, is provided before any additional valve control occurs. During this overlap an increased force of approximately one-half pound at the rim of the steering wheel occurs, without any appreciable additional turning of the worm 12. Additional angular movement of the valve parts results from the application of additional manual effort to the rim of the steering wheel and, as an illustrative case, an additional five degrees of relative movement may occur with a resultant final application of a nine pound force to the rim of the steering wheel. This force is substantially in excess of the normal power steering force and will be a very noticeable increase in driver effort. At the end of the five degree portion of the range, the total relative rotation will have approximated eight-and-one-half degrees, and further relative movement between the parts is prevented by the lost motion pin connection 24. Beyond this point, rotation between sleeve 19 and core 21 will not occur and the worm 12 will be driven directly, manually, by the splined connection 23, core 21, pin 24, sleeve 19, and pin 20.

In the five-degree relative motion area shown in FIGURE 4 and labeled "RESERVOIR OPERATION," the valve parts assume the condition generally illustrated in FIGURE 7a. In this condition, fluid is still flowing at its maximum from the pump by way of conduit 17a, groove 16 and channel 31 to one side of the power steering motor via port 33. A substantial overlap occurs at 16a and at 31a so that no appreciable leakage occurs from the power steering pump circuit. During this condition, a normally closed accumulator check valve 40, shown in FIGURES 1, 2, 5, 6 and 7, is unseated and vents the accumulator 41 to the channel 31 and power steering port 33.

Operation of the check valve 40 may be understood from a consideration of FIGURE 1. As there shown, accumulator 41 is ported to area 42 surrounding the torsion bar 25 by way of a conduit 43. Hydraulic fluid under accumulator pressure exists, accordingly, around the torsion bar 25 and acts against the ball valve 40 urging it radially against check valve seat 44. Upon unseating of the ball 40, hydraulic liquid under accumulator pressure passes to channel 16 via peripheral groove 45, clearly shown in FIGURES 1 and 2, and acts to augment the fluid flowing from the pump to the steering motor via port 33. A check valve 46 is provided in the steering pump line preventing flow backwardly through the pump under any circumstances so that if the pump is disabled and not producing at such time as the valve parts 19 and 21 call for accumulator augmentation, accumulator pressure will not be dissipated back through the pump but will, instead be applied to the power steering motor. As can be seen from FIGURES 5, 6 and 7, the normally seated valve 40 is not unseated at any time during the normal power steering operation but is, instead, only actuated by the small actuating ball 47 after substantial overlap of the valve parts 19 and 21 occurs, as shown in FIGURE 7, at 7a. The actuation of the ball 47 occurs by the angled ramps 48 of actuator groove 49 carried by ring 19a carried by ring 19.

In practice, it is desired that the accumulator accommodate approximately 20 cubic inches of displacement between its fluid charge and its normal minimum charge condition. For example, a satisfactory accumulator may be pressurized to a maximum pressure of approximately 1250 pounds per square inch with a minimum design pressure on the order of 700 pounds per square inch. In a maximum depleting condition, in which the power steering pump 15 is incapacitated and all steering is accomplished by the accumulator pressure, movement of the steering gear from the straight ahead condition to one of the maximum steered, or locked, condition requires approximately 7 cubic inches of hydraulic fluid. If the vehicle is moving at the time of such emergency use, a return steering movement would be normally accomplished by the caster effect of the vehicle wheel so that a turn in one direction and return to straight may be accomplished with approximately 7 cubic inches of fluid. Under these circumstances, a 20 cubic inch displacement accumulator would provide sufficient fluid under pressure to accomplish several turning motions under the worst circumstances. It will be appreciated, of course, that if mere augmentation of the steering pump 15 is required, such augmentation is accomplished with a very small additional volume of oil under high pressure so that depletion of the accumulator with such auxiliary steering motion, occasioned, for example, during avoidance maneuvers, will not cause major depletion of the accumulator.

In the embodiment of the invention shown in FIGURE 1, the pump 15 comprises a conventional power steering pump of moderate capacity and pressure. The pump is, conveniently, an inexpensive pump capable of providing a pressure on the order of 1250 pounds per square inch and a flow capacity on the order of two and one-half gallons per minute at engine idle. Such a pump is a relatively inexpensive pump compared to such high capacity high performance pumps as are capable of providing five gallons per minute at a similar maximum pressure. The pump 15 will ordinarily be required to provide 40 pounds per square inch or less to provide steering motion of the vehicle in the normal, down-the-road steering condition when steering loads are minimal. It will be appreciated, accordingly, that the pressure capacity of the pump 15 is greatly in excess of normal needs and, further, it will be apparent that in ordinary usage the capacity of the pump is similarly much higher than necessary for steering supply. In addition to the conventional flow control valve 49 provided to bypass excess oil at engine speeds in excess of idle speeds, an automatic valve may be employed for diverting a portion of the output of the pump 15 for accumulator charging purposes. The system shown in FIGURES 1 and 3 provide such a system.

As there shown, valve 50 is provided with a valve spool 51 having an enlarged end 52 and a reduced diameter end 53. The area of the enlarged end 52 is shown as $a_3$, the area of the stem of the spool 51 is shown as $a_2$, and the effective area of the end 53 is shown as $a_1$. A spring 55 acts against perforated plate 56 to bias the spool 51 toward the right as viewed in FIGURES 1 and 3 in which condition fluid flows from the pump 15 via check valve 46 and conduit 46a into the valve chamber 59 by way of conduit 60, restriction 61 and port 62. In this condition, fluid from the pump will be applied to the accumulator by way of the conduit 43a. At the same time, a small quantity of oil is passed from conduit 46a to valve chamber 57 by way of port 58 and bypass 62. The areas $a_1$, $a_2$, $a_3$ and the value of the spring 55 are provided to accomplish a balanced, automatically recharging system. In normal operation at which, for example, the accumulator is charged to 1,000 pounds per square inch, or greater, the pressure in chamber 59 is at such accumulator pressure. In normal driving in a down-the-road condition, the pressure in chamber 57 equals a value somewhat less than 40 pounds per square inch as above noted. Under such circumstances, the force of the spring 55 is designed to be unable to maintain the valve core in its right-hand position and, instead, the valve spool 51 moves into the left-hand position as shown in FIGURE 1. In these circumstances, the pressure $P_a$ in chamber 59 × the area $a_1$ + the pressure $P_s$ in chamber 57 × the area $a_3 - a_1$ will be greater than the force of the spring 55 for all values of $P_s$ that can occur. It will be noted that $P_s$ will not fall lower than approximately 20 pounds per square inch even if the steering valve 19, 21 of the steering gear is in its exactly centered condition and oil viscosity is low.

If due to use, the accumulator pressure drops, then at some predetermined value, for example, 700 pounds per square inch pressure in chamber 59, $$P_a \times a_1 + P_s \times (a_3 - a_2) = F$$

where F=the force of spring 55, the valve 51 will move toward the right all the way. Manifestly, this right-hand movement will ordinarily take place when the pressure in chamber 57 is at its minimal value or, in other words, at such times as no steering pressures are developed in the valve 19, 21.

In the above circumstances, with the valve 51 moved toward the right, as shown in FIGURE 3, the pump output from conduit 46a will divide between the steering gear and the accumulator. Flow to the steering gear by way of valve conduit 17 is determined by the restriction 62 and the difference between the pressure $P_p$ in the conduit 46a and the pressure $P_s$ in chamber 57, and will be arranged to be approximately 2 gallons per minute at a value of $P_p - P_s$ of 1,000 pounds per square inch when the valve opens, there will be about 1,000–700 pounds per square inch pressure drop across the restriction 61 which will then be arranged to provide an average rate of one-half gallon per minute to recharge the accumulator. If an accumulator of approximately 30 cubic inches total storage is provided, a complete recharge would, under the circumstances, take only several seconds. As the pressure $P_a$ in chamber 59 rises toward the desired maximum pressure value just below the overload relief pressure of the pump 15, $P_a$ acting on the area $a_2$ will overcome the spring force F of spring 55 and cause the valve 51 to move toward the left, closing and redirecting all of the flow of the pump 15 to the conduit 17 and the steering valve 19, 21.

Since spring 55 is chosen to have a low spring rate, movement of the valve toward the left will be rapid once the threshold value has been reached. Thus, as the accumulator is charged and $P_a$ is substantially equal to $P_p$ the valve will tend to reach an equilibrium position where flow through the restriction 61 is partly bypassed by the opening area of the port 58 at the edge 52a. The valve spool 51 would, under the circumstances, move no further toward the left than necessary to pass approximately two and one-half gallons per minute through the combined port and restriction 62 areas at the accumulator pressure. However, as the valve is now very sensitively balanced, the slightest rise in power steering pressure in the chamber 57, due to driver steering motion or road wheel movement (or fluctuation of the flow of pump 15 if the vehicle is stationary and the engine speed is increased), the valve will snap closed into its left-hand position in which the accumulator is fully charged and steering flow from the pump 15 is fully directed to conduit 17. Having closed, the valve cannot open again into the accumulator recharge position until the value $P_a$ in the chamber 59 reduces due to accumulator use or leakage and the reloading cycle starts again.

The valve 50 has an important ability to act as a priority valve. For example, during recharge of the accumulator, if the vehicle operator makes a sudden movement or maneuver that requires higher than normal pressures (in excess of approximately 40 pounds per square inch the rising value of $P_s$ in conduit 17 and chamber 57 will close the valve against the spring 55 and hence stop the accumulator charge until the relatively low normal steering conditions return. Of course, this may only take a few seconds, but it avoids a situation that would otherwise be undesirable, namely, a condition in which adequate steering flow is unavailable during accumulator recharge. This action will, of course, only occur if oil is flowing to the steering gear and the purpose of the restriction 61 is to avoid an empty, or completely dissipated, accumulator, taking so much fluid that the priority action cannot occur.

The result of the above system is that the accumulator 41 is provided with a substantially constant supply of high pressure steering fluid available to augment the steering fluid output of the pump 15. Thus, if the vehicle is being parked and the full output of the pump 15 is insufficient in quantity and pressure to operate the steering system fast enough to prevent the steering valve 19, 21 from moving into its overlapped, manual, phase, fluid from the accumulator will be introduced past valve 40 to augment the steering action and provide additional power. Similarly, if the pump 15 is to fail for any reason, the fluid in the accumulator 41 is available to provide emergency steering until the vehicle can be maneuvered off the highway or parked. Thus the system could be viewed as having two main modes of operation, the first associated with conventionally provided maximum turn rates of the steering wheel and normal fluid flow, and the second associated with either excess turn rates of the wheel, or cessation of normal flow, or both.

A similar, though somewhat modified, embodiment of the present invention is shown in FIGURES 8 and 9 where two pumps are employed. Again, two main modes of operation are provided. In the schematic diagram of FIGURE 8, the steering valve 10 and the accumulator 41 are the same as shown in FIGURE 1. However, the accumulator is charged by way of a bypass valve 70 in combination with a low-pressure pump 71 and a high pressure pump 72. The low pressure pump 71 may conveniently comprise the oil pump of the vehicle engine or transmission and would conventionally provide a relatively low pressure source, for example, 300 pounds per square inch, where the oil is from the engine lubricating oil pump or transmission pump (300 pounds per square inch can be obtained from such pumps without significant change other than modifying the pump's flow control bypass valves, and such an improved pump is preferred in order to assure all normal turning will be accomplished by the low pressure pump). The normal capacity of such pumps comprises perhaps one and one-half gallons per minute at engine idle. The pump 72, on the other hand, comprises a low capacity, high pressure pump capable of providing approximately 1250 to 1500 pounds per square inch capable of deliverying approximately one-half gallon per minute at idle speeds. In this case, the first mode is associated with somewhat less than conventional maximum turn rates of the steering wheel, and with pressures never exceeding those associated with normal driving or turning of the car (these rarely exceed 300 p.s.i. or about one-quarter of that needed to turn the wheels while the car is stationary). The second mode, as in the case of the system described above, includes excess turn rates of the steering wheel, and cessation of oil flow but additionally operation of the steering system while parking. The On-Off nature of operation of valve 40, that is, having no feel or feed-back to the driver is of no detriment to the steering system as the signal is of no consequence while parking. Neither of these pumps is expensive and the combination of a low pressure moderate capacity pump with a high pressure, low capacity pump provides a total system, when used as described hereinafter, that is inexpensive and yet in effective.

The bypass valve 70 comprises a plunger 75 spring-biased by spring 76. Oil pressure is directed to valve inlet 77 from the pump 71. The high pressure pump 72 receives fluid flow from the bypass valve 70 by way of outlet 79 and returns fluid at a high pressure to the valve 70 by way of inlet 81.

In the system shown, when the accumulator pressure, and hence the pressure in valve chamber 82 is at a reduced value, the spring 76 will hold the valve plunger 75 in its right-hand condition in which condition part of the output of the low pressure pump will enter chamber 83 and pass through the valve plunger 75 by way of ports 84 and from thence into the high pressure pump 72 via the valve outlet 79. Upon pressurization to a high, desired accumulator, pressure, the fluid will enter the valve inlet 81, pass into chamber 82 and into accumulator 41 via conduit 41a. When the pressure in chamber 82 and accumulator 41 reaches its desired maximum, the valve plunger 75 will snap to the left, in which condition the input of the high pressure pump is closed off, or starved, and the pump 72 is, in effect, unloaded and ineffective. Hydraulic liquid leaving the steering gear 10 by way of conduit 89 passes through a bypass 90 which maintains a pressure, such as for example, 30 pounds per square inch in a conduit 91 leading to the engine crank shaft and other parts to be lubricated, and bypasses any excess via conduit 92 to the sump 88. With the arrangement shown, any high pressure steering requirements are met by the accumulator while down-the-road steering is provided by the relatively inexpensive engine lubrication oil of power transmission pump. This arrangement permits substantial reduction in cost of power steering and, accordingly, permits the utilization of improved performance, and safer, power steering with less expensive automobiles.

A still further inexpensive modified form of the invention may be seen in FIGURES 10 and 11 wherein a conventional pump 15 is provided in combination with an accumulator 41 which ports into augmenting conduit 43. The charging valve 100 incorporates a spool 101 biased toward the left by spring 102. Port 103 leads hydraulic fluid under pressure from pump 15 to relief valve 104 which unseats against the action of spring 105 upon attainment of maximum accumulator loading pressure in conduit 106.

In the condition of the parts shown in FIGURE 11, the vehicle has been standing idle, for example, overnight, so that pressure in the conduit 106 may be zero and the valve core 101 is in the left-hand position, as shown in FIGURE 11. In this condition, switch 110 is closed. Switch 110 is in series with the automotive ignition 111 so that upon energization of the ignition switch to start the vehicle, a red warning light 112 is energized, indicating that the accumulator is in a charging condition. If, in fact, accumulator recharge is called for, the entire output of the pump 15, upon initial starting of the engine, is directed past check valve 107 into the accumulator 41 until the pressure in the accumulator 41 reaches the maximum desired accumulator pressure, at which point the relief valve 104 will unseat and the full pump pressure will be applied to the left-hand end of the valve spool 101 causing it to move into the right-hand position as shown in FIGURE 10. In the right-hand position, as shown in FIGURE 10, the output of the pump 15 is directed via chamber 108 into conduit 17 and, at the same time, switch 110 is opened, causing the accumulator charging light 112 to be deenergized. Normal pressure of the pump 15, approximating a minimum of 20 pound minimal back pressure when the steering valve 10 is in the neutral, open-center condition, is sufficient to cause the valve core 101 to remain in its right-hand position, but upon stopping the vehicle engine, the pressure will drop to zero again, conditioning the system for recharging the accumulator, if needed.

It will be apparent, from the description of the system of FIGURES 10 and 11, that the accumulator is charged every time the vehicle engine has been stopped and the steering pump 15 is disabled. Otherwise, the accumulator is recharged only when pressure therein is lower than the power steering pressure being applied by the pump while steering. It has been found, however, that normal vehicle operation, from engine-start to engine-stop, will not deplete the accumulator, even though many avoidance maneuvers are undertaken. If however, during long term running after a number of high load parking turns, such as for example, on a turnpike after a number of high load parking turns have previously been made, a yellow warning light 113 may be provided. The light 113 will be energized upon a reduction in pressure in the accumulator 41 to a low value sensed by a pressure-responsive switch 114. The condition of the two warning lights 112, 113 will, accordingly, advise the driver that the accumulator is being recharged or, that the accumulator is discharged and needs recharging by a momentary disabling of the pump 15. Although disabling of the pump 15 may readily be accomplished by turning off the engine ignition and stopping the vehicle, the same result can be achieved by the provision of a manual or electro-magnetic valve at the outlet of pump 15 directly dumping the total output of the pump 15 to the sump momentarily, to thereby permit movement of the valve core 101 to the left-hand accumulator recharge condition, as shown in FIGURE 11. It has been found that the accumulator will be recharged in a few seconds at the most. It will be appreciated that even though the accumulator is completely discharged, the moderate capacity of the standard power steering pump 15 will provide normal power steering for all except unusual peak loads or rapid avoidance maneuvers, which situations are not now presently overcome in commercial practice. Utilization of the accumulator and the recharging valve described in FIGURES 10 and 11 provides, accordingly, a much superior steering system compared to the presently existing systems, for almost all circumstances, and warns the driver when the reserve, or peak power steering aid has been used and should be replenished. Since even turnpike driving is ordinarily accompanied by rest stops at numerous intervals, it has been found that the chance of the yellow light 113 going on it almost nil.

It will be apparent to those skilled in the art of power steering systems that I have provided a novel, dual-mode power steering construction capable of construction in several embodiments, all of which provide augmented high pressure power steering for improved parking and avoidance maneuvers. These systems greatly improve the safety of the steering systems without requiring expensive power steering pumps or the like. Accordingly, safety of the vehicles using such systems is improved and such power steering systems are rendered sufficiently inexpensive to permit their installation in almost all vehicles presently on the highway.

I claim as my invention:

1. In combination in a power steering system for dirigible wheels of a vehicle, including a normally continuous source of hydraulic fluid under pressure, a two-directional steering motor and normally open-center steering valve, means directing fluid from said source to and from said motor and to a sump, the improvement comprising an accumulator means for storing hydraulic fluid under high pressure, normally closed valve means retaining said hydraulic fluid under pressure in said accumulator means, and means responsive to actuation of said open-center valve means beyond its condition of normal maximum pressurization of the selected side of said motor to actuate said normally closed valve into open condition, and means connecting the outlet of said normally closed valve to the selected side of said motor.

2. The power steering system constructed in accordance with claim 1 including one-way check valve means positioned between said source of hydraulic fluid and said closed center valve preventing fluid flow from said accumulator back to said source.

3. The power steering construction set forth in accordance with claim 2 including means charging said accumulator.

4. The power steering construction set forth in claim 1 wherein said vehicle includes an engine having an engine lubricating-oil pump and said source comprises the lubricating-oil pump of the vehicle engine.

5. The structure in accordance with claim 3 wherein said last-named means comprises a second source of hydraulic fluid under pressure and means intermittently connecting said second source to said accumulator to maintain said accumulator charge at a high fluid pressure.

6. The power steering apparatus set forth in claim 3 wherein said last-named means comprises an accumulator charging valve normally biased into a condition of directing fluid from said source to said accumulator and including means overcoming said bias upon accumulation of pressure in said accumulator to a predetermined high pressure level.

7. The power steering apparatus set forth in claim 6 where fluid bypass means provides small capacity fluid flow through said charging valve to said power steering open-center valve simultaneously with recharging of said accumulator.

8. The power steering apparatus set forth in claim 3 wherein pressure responsive warning means is connected to the outlet of said accumulator indicating a pressure therein below a predetermined minimum.

9. A dual-mode power steering system comprising a source of normally continuous fluid flow, a first steering-torque-responsive open-center valve normally open for bypassing said source to a sump and movable through a first range upon application of steering torque in the normal range to direct said fluid to a selected one side of power steering motor means and to vent the other side of said power steering motor means to said sump, and accumulator for storage of fluid at a high pressure, a normally closed valve connecting said accumulator to the fluid inlet of said first valve, and actuating means operative to open said normally closed valve upon occurrence of steering torque in excess of the normal range and movement of said first valve to a position closing flow from the fluid inlet of said first valve to said sump.

10. The power steering system set forth in claim 9 wherein said open-center valve comprises relatively movable sleeve and core members with cooperating flow control ports and wherein said normally closed valve comprises a check valve actuated by relative over-travel movement of said sleeve and core beyond said first range.

11. In combination in a power steering system for dirigible wheels of a vehicle having an engine and means for starting said engine for the propulsion thereof, including a normally continuous source of hydraulic fluid under pressure, a two-directional steering motor and normally open-center steering valve, means directing fluid from said source to and from said motor and to a sump, the improvement comprising an accumulator means for storing hydraulic fluid under high pressure, normally closed valve means retaining said hydraulic fluid under pressure in said accumulator means, and means responsive to actuation of said open-center valve means beyond its condition of normal maximum pressurization of the selected side of said motor to actuate said normally closed valve into open condition, means connecting the outlet of said normally closed valve to the selected side of said motor, and means responsive to energization of the starting means following engine inactivity to direct fluid from said source to said accumulator and responsive to an ensuing predetermined charge in said accumulator to direct fluid to said open-center steering valve.

12. The dual-mode power steering system set forth in claim 11 wherein said last-named means comprises a by-pass valve having a valve plunger normally biased into a position forcing fluid from said source to flow into said accumulator and counter-biased by the pressure of the fluid thus directed to said accumulator toward a position directing fluid from said source to said open-center steering valve.

References Cited

UNITED STATES PATENTS

| | | |
|---|---|---|
| 3,099,327 | 7/1963 | McAdams. |
| 1,384,490 | 7/1921 | Simmon 91—5 |
| 3,225,544 | 12/1965 | Lemley 91—5 |

PAUL E. MASLOUSKY, Primary Examiner

U.S. Cl. X.R.

60—52; 91—1, 6, 447